United States Patent
Howlett et al.

(10) Patent No.: US 12,051,876 B2
(45) Date of Patent: *Jul. 30, 2024

(54) MONITORING OF DEVICES

(71) Applicant: Cirrus Logic International Semiconductor Ltd., Edinburgh (GB)

(72) Inventors: Andrew James Howlett, Edinburgh (GB); Gordon Russell, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/020,875

(22) Filed: Sep. 15, 2020

(65) Prior Publication Data
US 2020/0412071 A1 Dec. 31, 2020

Related U.S. Application Data

(63) Continuation of application No. 15/591,764, filed on May 10, 2017.
(Continued)

(30) Foreign Application Priority Data

Jun. 30, 2016 (GB) ...................................... 1611348

(51) Int. Cl.
*G06F 1/32* (2019.01)
*G06F 1/3231* (2019.01)
(Continued)

(52) U.S. Cl.
CPC ....... *H01R 13/6683* (2013.01); *G06F 1/3231* (2013.01); *G06F 1/3296* (2013.01);
(Continued)

(58) Field of Classification Search
CPC ..................................... G06F 1/26; G06F 1/32
See application file for complete search history.

(56) References Cited

U.S. PATENT DOCUMENTS 5,974,577 A 10/1999 Ma
6,255,850 B1 * 7/2001 Turner ............. H03K 19/00315
326/86
(Continued)

FOREIGN PATENT DOCUMENTS

EP 1903765 A2 3/2008
EP 2808968 A1 12/2014
(Continued)

OTHER PUBLICATIONS

Combined Search and Examination Report under Sections 17 and 18(3), Intellectual Property Office of the United Kingdom, Application No. GB1611348.2, mailed Nov. 29, 2016.
(Continued)

*Primary Examiner* — Phil K Nguyen
(74) *Attorney, Agent, or Firm* — Jackson Walker L.L.P.

(57) ABSTRACT

This application relates to monitoring of electronic devices (100) and in particular to methods and apparatus for the detection and recording of an electrical overstress applied to a connector (101, 102) of the device. The apparatus describes an integrated circuit (103, 105) of the host device having a first set of one or more circuit contacts (201, 203, 204, 205) for connection to a connector (101) of a host electronic device. The circuit has an electrical overstress monitor (106, 106a) for detecting and recording an electrical overstress comprising a voltage exceeding a predetermined parameter applied to at least one of said first set of circuit contacts. The electrical overstress monitor (106) may have an overvoltage detector (205) and may have a memory (206) for recording the occurrence of an overvoltage and/or a communication module (207) for communicating with other components of the host device in the event of an electrical overstress.

20 Claims, 3 Drawing Sheets

Related U.S. Application Data (60) Provisional application No. 62/343,444, filed on May 31, 2016.

(51) Int. Cl.
| | |
|---|---|
| *G06F 1/3296* | (2019.01) |
| *H01R 13/66* | (2006.01) |
| *H02H 3/20* | (2006.01) |
| *H02H 9/04* | (2006.01) |
| *H04M 19/00* | (2006.01) |

(52) U.S. Cl.
CPC ..... *H01R 13/6666* (2013.01); *H01R 13/6675* (2013.01); *H01R 13/6691* (2013.01); *H02H 3/202* (2013.01); *H02H 9/04* (2013.01); *H04M 19/00* (2013.01); *H01R 2201/06* (2013.01)

(56) References Cited

U.S. PATENT DOCUMENTS

| | | | |
|---|---|---|---|
| 6,819,539 B1 | 11/2004 | Wright et al. | |
| 6,985,019 B1* | 1/2006 | Zhou | H03K 19/018507 |
| | | | 327/309 |
| 7,349,546 B2 | 3/2008 | Ganton | |
| 7,518,844 B1* | 4/2009 | Xu | H02H 9/046 |
| | | | 361/111 |
| 9,575,111 B1* | 2/2017 | Karp | H02H 3/00 |
| 2002/0030955 A1* | 3/2002 | Woo | H02H 9/046 |
| | | | 361/56 |
| 2002/0075617 A1* | 6/2002 | Ponton | H01L 27/0266 |
| | | | 361/91.1 |
| 2003/0090309 A1* | 5/2003 | Hunt | H03K 5/08 |
| | | | 327/309 |
| 2004/0021178 A1* | 2/2004 | Larson | H01L 27/0255 |
| | | | 257/355 |
| 2005/0033998 A1 | 2/2005 | Honda et al. | |
| 2005/0099745 A1 | 5/2005 | Fischer et al. | |
| 2005/0231287 A1 | 10/2005 | Wong et al. | |
| 2005/0267728 A1 | 12/2005 | Maher et al. | |
| 2008/0151457 A1* | 6/2008 | Apfel | H04L 12/10 |
| | | | 361/111 |
| 2009/0116158 A1* | 5/2009 | Graves | H02H 3/20 |
| | | | 361/91.1 |
| 2009/0154039 A1 | 6/2009 | Tsugawa | |
| 2010/0067158 A1 | 3/2010 | Saarinen | |
| 2010/0123978 A1* | 5/2010 | Lin | H02M 3/156 |
| | | | 361/18 |
| 2010/0246075 A1 | 9/2010 | Chao | |
| 2010/0271742 A1 | 10/2010 | Shannon et al. | |
| 2011/0118992 A1 | 5/2011 | Yang | |
| 2012/0126625 A1 | 5/2012 | Maher et al. | |
| 2012/0200962 A1 | 8/2012 | Collura et al. | |
| 2012/0275077 A1 | 11/2012 | Pedersen et al. | |
| 2013/0113446 A1 | 5/2013 | De Haas | |
| 2013/0113508 A1 | 5/2013 | Chu et al. | |
| 2014/0281626 A1* | 9/2014 | Younger | G06F 1/3287 |
| | | | 713/323 |
| 2015/0145594 A1 | 5/2015 | Scott et al. | |
| 2015/0362550 A1 | 12/2015 | Wibben | |
| 2016/0091940 A1* | 3/2016 | Oh | G06F 1/26 |
| | | | 713/300 |
| 2016/0190794 A1* | 6/2016 | Forghani-Zadeh | H02H 9/045 |
| | | | 361/86 |
| 2016/0249127 A1* | 8/2016 | Kim | G10K 11/17881 |
| 2016/0267754 A1* | 9/2016 | Hickman | G01R 1/07 |
| 2016/0285255 A1* | 9/2016 | O'Donnell | H02H 9/02 |
| 2016/0372920 A1* | 12/2016 | Kinzer | H01L 27/0266 |
| 2017/0344098 A1* | 11/2017 | Abu Hilal | H03K 17/223 |

FOREIGN PATENT DOCUMENTS

| | | |
|---|---|---|
| EP | 3073594 A1 | 9/2016 |
| JP | 2004166391 A | 6/2004 |
| WO | 200806547 A1 | 6/2008 |

OTHER PUBLICATIONS

Examination Report under Section 18(3), UKIPO, Application No. GB1611348.2, mailed Apr. 14, 2020.
International Search Report and Written Opinion of the International Searching Authority, International Application No. PCT/GB2017/051561, mailed Sep. 22, 2017.
Examination Report under Section 18(3), UKIPO, Application No. GB1611348.2, mailed Jun. 24, 2019.
International Search Report and Written Opinion of the International Searching Authority, International Application No. PCT/GB2017/051365, mailed Aug. 16, 2017.

\* cited by examiner

MONITORING OF DEVICES

The present disclosure is a continuation of U.S. Non-Provisional patent application Ser. No. 15/591,764, filed May 10, 2017, which claims benefit of U.S. Provisional Patent Application Ser. No. 62/343,444, filed May 31, 2016, and United Kingdom Patent Application No. 1611348.2, filed Jun. 30, 2016, each which is incorporated by reference herein in its entirety.

FIELD OF DISCLOSURE

This application relates to monitoring of electronic devices and in particular to methods and apparatus for the detection and recording of an electrical overstress applied to the device.

BACKGROUND

Devices such as portable electronic devices have become very popular and there is currently a large market for portable electronic devices such as mobile telephones or tablet computers or the like. In use such portable electronic devices may fail or become damaged for a variety of reasons and a user may return a failed or damaged device to a supplier/manufacturer for repair or replacement.

It would be desirable for a manufacturer to be able to discern whether a cause of damage or failure of a device was or was likely due to user action.

SUMMARY

Aspects of the present disclosure relate to methods and apparatus for detecting user activity that may have caused damage to a device.

Thus according to one aspect of the present invention there is provided an integrated circuit comprising: a first set of one or more circuit contacts for connection to a connector of a host electronic device; and an electrical overstress monitor for detecting and recording an electrical overstress comprising a voltage exceeding a predetermined parameter applied to at least one of said first set of circuit contacts.

The electrical overstress monitor may comprise an overvoltage detector for detecting a voltage above a predetermined magnitude applied to at least one of said first set of circuit contacts. The predetermined parameter may thus be a predetermined voltage magnitude.

Each of a plurality of circuit contacts of the first set may be connected to a respective overvoltage detector. In some embodiments the overvoltage detector may comprise at least one comparator for comparing a monitored voltage derived from the relevant circuit contact to at least one reference voltage.

In some embodiments the overvoltage detector may be configured to monitor a voltage at a first rail to which a plurality of the first set of circuit contacts are connected via switching elements that activate in the event of a voltage above the predetermined magnitude. In some embodiments there may be voltage clamping circuit for clamping the voltage at the first rail in the event of a voltage above the predetermined magnitude. The overvoltage detector may be configured to detect activation of the clamping circuit.

The electrical overstress monitor may comprise a memory for recording the occurrence of an electrical overstress event. The electrical overstress monitor may be further configured to record information regarding the time of occurrence of an electrical overstress event in the memory.

The electrical overstress monitor may comprise a communication module for communicating with other components of the host device in the event that an electrical overstress event is detected. The communication module may be configured to generate an interrupt signal for a processor of the host device.

The integrated circuit may have a first circuit contact for receiving power from an always-on power domain of the host device and the electrical overstress monitor may be coupled to receive power from the first circuit contact.

In some embodiments the electrical overstress monitor may be configured to monitor an electrical parameter at a monitoring node when the electrical overstress monitor is powered. The electrical overstress monitor may comprise a variable state component that changes states in the event of a voltage above the predetermined threshold where the electrical parameter at the monitoring node when the electrical overstress monitor is powered depends on the state of the variable state component. The variable state component may comprise a fuse.

The predetermined parameter may be a voltage magnitude equal to or greater than the breakdown voltage of integrated circuit.

At least one of the first set of circuit contacts may be a circuit contact for transfer of analogue audio signals to and/or from the integrated circuit.

In some embodiments the integrated circuit may be a codec or a USB interface control circuit. In some embodiments the integrated circuit may be a dedicated circuit for detecting and recording electrical overstress events.

Embodiments also relate to an electronic device comprising an integrated circuit as described in any of the variants discussed above and a first device connector, where the first set of circuit contacts of the integrated circuit are connected to the first device connector.

The first device connector may be a socket such as a jack socket. The first device connector may be a USB receptacle. The first device connector may be rotationally symmetric.

The electronic device may further comprise a device processor. The electrical overstress monitor may be configured to send a first control signal to the device processor following detection of an electrical overstress event. On receipt of the first control signal the device processor may be configured to record the occurrence of an electrical overstress event. The device processor may be further configured to record information regarding the time of receipt of the first control signal and/or to record data relating to the operation of the electronic device before and/or after receipt of the first control signal.

The electronic device may be at least one of: a portable device; a communications device; a computing device; a mobile telephone; a notebook, laptop or tablet computing device.

In a further aspect there is provided an electronic device comprising:
  a first connector having at least one contact for connecting the electronic device to external apparatus; and
  an electrical overstress monitor for detecting a voltage above a predetermined magnitude applied to the at least one of the contacts of the first connector;
  wherein the electronic device is configured to record the occurrence of a voltage above a predetermined magnitude.

The electronic device of this aspect may be implemented with an integrated circuit as discussed in any of the variants above.

The electrical overstress monitor may form part of an always-on power domain of the host device. The electrical overstress monitor may comprise a memory for recording the occurrence of the voltage above a predetermined magnitude. The electrical overstress monitor may be further configured to record information regarding the time of occurrence of a voltage above the predetermined magnitude in the memory. The electrical overstress monitor may additionally or alternatively comprise a communication module for communicating with other components of the host device in the event that a voltage above the predetermined magnitude is detected. The communication module may be configured to generate an interrupt signal for a processor of the host device. The processor may be configured to record the occurrence of a voltage above the predetermined magnitude in a device memory. The processor may be configured to output and/or display information regarding any occurrence of a voltage above the predetermined magnitude in response to a relevant command.

In a further aspect there is provided an electronic device comprising an electrical overstress monitor for detecting and recording an electrical overstress event applied to a connector of the device.

In a yet further aspect there is provided a mobile phone comprising an overvoltage monitor for detecting and recording an overvoltage applied to a socket of the phone.

BRIEF DESCRIPTION OF THE DRAWINGS

To illustrate and explain various features of aspects of the invention, embodiments will now be described with reference to the accompanying drawings, of which.

DETAILED DESCRIPTION

Figure 1:
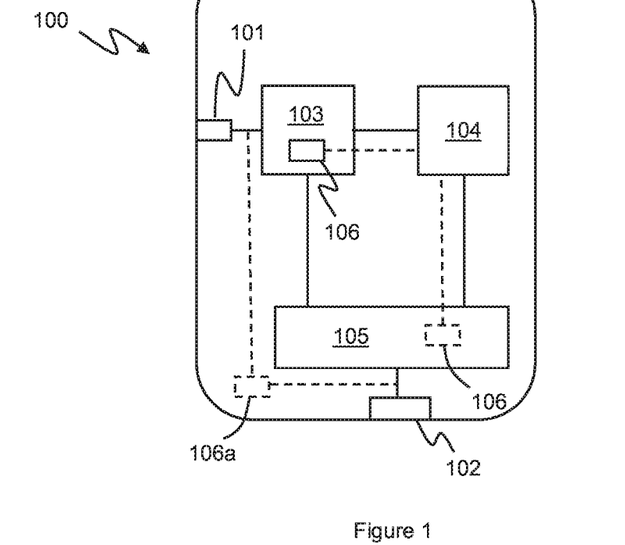
FIG. 1 illustrates one example of a portable electronic device.

FIG. 1 illustrates an electronic device 100, which may for example be a portable electronic device such as a mobile telephone, e.g. a smartphone, or a tablet computing device or the like. Such devices may have a number of connectors 101, 102 for allowing an external apparatus, e.g. an accessory such as a headset or the like, to be physically removably connected to the electronic device 100 in use.

For example there may be a socket 101 for receiving a plug of an accessory device such as a headset. One type of common connector is a 3.5 mm jack socket for connection with a three-pole (TRS) or four pole (TRRS) jack plug. Such a connector may, in some devices, be used for a variety of purposes but commonly may be used for transfer of audio signals to/from the electronic device 100, e.g. to output analogue audio signals to a connected audio accessory such as a headset or set of external loudspeakers and/or to receive audio input from a microphone. Such a connector 101 may therefore be electrically connected to audio circuitry 103, such as an audio codec of the electronic device 100. The codec 103 may be connected to other circuits 104 of the electronic device 100 such as an applications processor.

Additionally or alternatively the electronic device 100 may comprise other types of connector, for instance a multi-purpose connector 102 such as a USB connector, for example a USB-C connector. The USB type-C compact 24-pin connector is a reversible connector, i.e. it is rotationally symmetric (with a rotational symmetry of order 2) and is designed to be operable with a type-C plug mated with a type-C receptacle in either possible mating orientation. Such an interface may also be used for a variety of purposes which include at least some of transfer of digital data, charging of the electronic device 100 and, in some instances, transfer of analogue audio signals. Typically such a connector may be configured in different ways depending on the usage and connector configuration/control circuitry 105 such as a USB PHY circuit may be connected to the USB connector 102 for device discovery and control of the interface with a connected apparatus. It will of course be appreciated that there are other types of connector that may additionally or alternatively be used, at least some of which may also be reversible connectors, i.e. rotationally symmetric.

An increasing problem that has been identified is damage being caused to such electronic devices due to an electrical overstress (EOS) being applied to components of the electronic device via one of the connectors, e.g. 101 or 102. Such an electrical overstress may for instance be a high voltage applied to one of the connectors by a user, such as a user connecting the jack socket 101 to a mains voltage. Such a user applied electrical overstress could be accidental but a growing problem is users willfully applying such a high voltage to the electronic device so as to deliberately damage the device so it can be returned to the supplier/manufacturer for a newer replacement.

An electrical overstress applied to a component, such as codec 103, of the device may result in damage to the component, e.g. the codec. For instance a component of the device may have a voltage rating of the order of a few volts or so. The overvoltage rating of some component circuits of interest may be for instance in the range of say 1V to 5V. A relatively high voltage, say of the order of 10V or so may result in damage. The relevant voltages of concern will depend on the specific components and device arrangement.

Many electronic devices may be designed to be relatively robust for a certain level of electrical stress above normal operating levels, e.g. voltage surges. The device may therefore comprise protection circuitry for preventing the components of the device from being damaged by at least some electrical overstress. Such protection circuitry may for instance include on-chip protection circuitry, e.g. protection circuitry included on the codec 103 designed to try to limit or clamp the voltage at the chip to acceptable levels, and/or circuitry coupled to the contacts 101, 102 to limit the voltage experienced by the components of the device such as codec 103. However it may not be commercially practical to provide sufficient robustness against application of mains level voltages, e.g. voltage magnitudes of the order of 100V or higher.

It has therefore been appreciated that there would be benefit in an electronic device 100 being able to detect and record electrical overstress events. A device manufacturer receiving a returned malfunctioning electronic device would be able to determine that the device had been subjected to a significant electrical overstress and thus would better be able to determine whether a cause of failure was due to user activity and not some random fault or, especially the case is a large number of electronic devices are returned with similar failure modes, due to some systematic fault in a given manufacturing run. Information about whether a circuit of a device had been subjected to an electrical overstress could also be of interest for other reasons, for instance to determine whether any protection circuitry did actually protect the device.

In embodiments of the present disclosure therefore describe methods and apparatus for detecting and recording an electrical overstress applied to the electronic device via one of the connectors of the device. The electrical overstress may comprise application of a relatively high voltage to a connector, e.g. a voltage greater than a predetermined magnitude, which may be above the nominal operating voltage for that connector. The electrical overstress may comprise application of a voltage of sufficient magnitude and duration as may potentially cause damage to a component circuit of the device or which may be expected to cause damage to a component circuit of the device in the absence of any surge protection circuitry. An electrical overstress (EOS) may include, in particular, application of a voltage exceeding a predetermined threshold characteristic, which may be voltage magnitude or a voltage above a threshold applied for a certain duration. The relevant voltage level may vary for different electronic devices but in some applications an electrical overstress may comprise application of a voltage with magnitude of around 50V or greater or around 80V or greater or around 100V or greater to the connector of a device. It will of course be appreciated that any resulting electrical overstress appearing at a component of the device will depend on the arrangement of the device.

The electronic device 100 may therefore comprise at least one electrical overstress monitor 106. As described above the electrical overstress may be applied to the electronic device via one of the connectors and thus an electrical overstress monitor 106 may be included as part of the circuitry connected to that connector.

For example codec 103 may comprise an electrical overstress monitor 106 for detecting an electrical overstress applied to one or more of the contacts of jack socket 101. The electrical overstress monitor 106 may detect the electrical overstress and, on occurrence of an electrical overstress event, record the occurrence of electrical overstress event. The occurrence of an electrical overstress event may, in some embodiments, be recorded in the electrical overstress monitor itself. Additionally or alternatively the electrical overstress monitor may, following an electrical overstress event, communicate with some other circuitry or module of the electronic device 100, for instance by sending a suitable interrupt to the applications processor 104. The applications processor may then record the occurrence of the electrical overstress event.

It has been appreciated that whilst the application of a high voltage, e.g. of the order of 100V magnitude or so, to a connector of the electronic device will typically cause damage to the circuitry connected to the relevant connector, the damage may only affect parts of the circuitry and many parts of the electronic device may remain functional. For instance a mains level voltage applied to a jack socket may result in damage to the codec 103 which affects audio playback and/or detection of microphone signals but various aspects of the codec may remain functional and the applications processor 104 may likewise continue to function. It has therefore been appreciated that it is possible to use circuitry within the electronic device to detect and record an electrical overstress event.

Occurrence of the electrical overstress event may be recorded in one or more of a number of different ways, for instance by storing information in a suitable register or other memory or by changing the state of some programmable element such as a fuse or the like. Recording the occurrence of an electrical overstress event may involve recording that an event occurred, e.g. by setting a status flag, or may involve more detailed information about the event. Parametric information regarding the electrical overstress may be recorded, for instance an indication of the magnitude of the voltage level detected by the overstress monitor, say as compared to one or more thresholds, may be recorded.

The information regarding the occurrence of an electrical overstress may be recorded in a memory of the device which is not normally accessible to a user of the device to overwrite, i.e. a protected memory of the device.

The information may be recorded with at least some time stamp data indicative of when the electrical overstress event occurred, i.e. date/time information. In some instances information regarding the duration of an electrical overstress may be recorded. Other information relevant to the event, such as a device location e.g. as may be obtained from a GPS module or the like, may be stored. In some instances data regarding operational parameters of the electronic device before and/or after the electrical overstress event may be recorded.

Where an electronic device has multiple connectors, such as the example electronic device 100 illustrated in FIG. 1, then one or more connectors may each have a suitable electrical overstress monitor 106, for instance in this example each of the codec 103 and USB PHY 105 may have a suitable electrical overstress monitor 106. In some implementations however it may be possible to have one electrical overstress monitor arranged to monitor for electrical overstress at more than one connector. The electrical overstress monitor may be implemented in an integrated circuit that is connected to a relevant connector, e.g. in codec 103 and/or USB PHY 105 and/or an electrical overstress monitor 106a may be provided as a separate component.

A circuit of a host electronic device 100 that connects to a device connector, e.g. codec 103, will typically be implemented as an integrated circuit, i.e. a chip. The integrated circuit will comprise various circuit contacts for making connections with other components of the device such as a device connector. The circuit contacts of the integrated circuit may comprise pins, landings pads, terminals etc. There may be a first set of one or more circuit contacts that, in use, are connected to contacts of the connector and another set of circuit contacts that are connected to other components of the host electronic device. The electrical overstress monitor may detect and record an electrical overstress comprising a voltage exceeding a predetermined parameter, such as a predetermined voltage magnitude, applied to at least one of said first set of circuit contacts.

Figure 2:
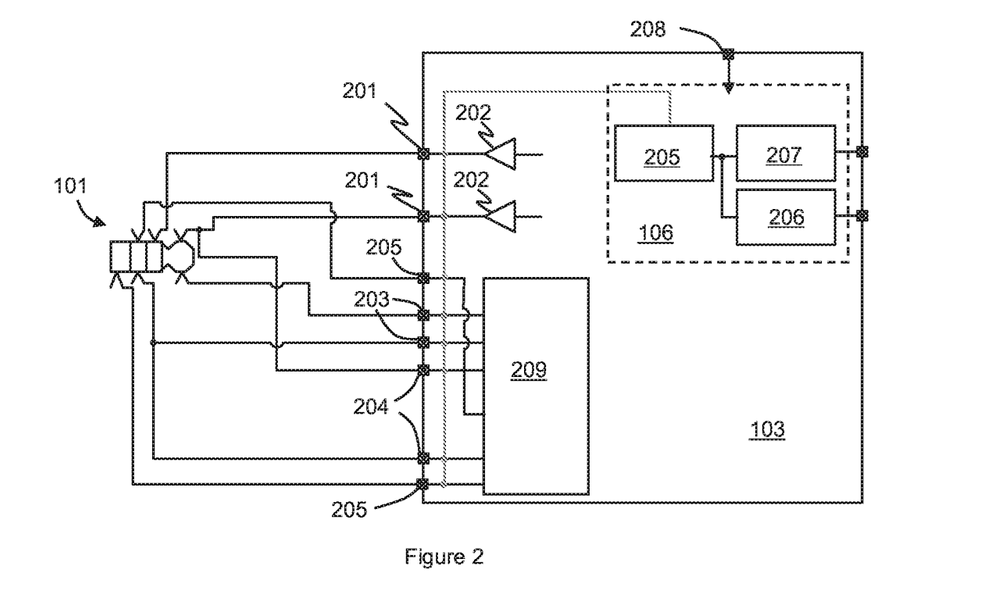
FIG. 2 illustrates an example of an audio circuit having an electrical overstress monitor.

FIG. 2 illustrates one example of how an electrical overstress monitor 106 may be arranged as part of a circuit connected to a connector, in this example a codec 103 connected to a jack socket connector 101.

FIG. 2 just illustrates some of the functional components of an example codec to illustrate the principles of the embodiment. Thus for example the codec may have circuit contacts or pins 201 for providing left and right analogue audio signals from audio drivers 202 to appropriate poles of the jack socket 101 in use. The codec may have one or more pins 203 for jack detection, i.e. for detecting when a jack plug is connected/disconnected from the socket and pins 204 for headphone detection, i.e. detecting whether a connected accessory has headphones and possibly categorising what type so as to configure the codec appropriately. There may also be pins 205 associated with a microphone, e.g. for detecting whether a microphone is present and establishing which pole of the connected jack plug corresponds to the microphone and which to a ground return and for providing a microphone bias and detecting a microphone signal. These pins may be connected to microphone/interface control and configuration circuitry 209.

At least some and preferably all of the first set of pins electrically connected to contacts of the jack socket 101 are monitored by an on-chip electrical overstress monitor 106. An overvoltage detector 205 detects an occurrence of a voltage above a certain threshold level, which may for example be in the range of 50-100V as applied to the contact 101. In some embodiments there may, for one or more of the pins, be a separate overvoltage detector associated with each respective pin as will be described in more detail later. In other embodiments one overvoltage detector may monitor a rail to which several pins are connected through switching components that activate in the event of a voltage above the threshold as will be described in more detail later. It will therefore be appreciated that FIG. 2 illustrates the conceptual arrangement and is not intended to show any particular circuit configuration.

In the event that an overvoltage above the threshold is detected the occurrence of the overvoltage event may be recorded in a memory, such as register 206.

It will be understood by one skilled in the art that an electronic device 100 may have various different power modes of operation. For instance there may be an active mode where the device is fully powered and the applications processor is running. There may also be at least one lower power mode, for instance a sleep mode, where at least parts of the electronic device may be unpowered. In a sleep mode the applications processor may be generally inactive and at least parts of the codec 103 may be unpowered, although circuitry associated with detecting connection of a jack plug may be powered and operational. There may also be an off mode where the majority of the device is inactive but some features are powered, e.g. a real time clock circuit and button detect modules. It is also possible a device could be without a power source, e.g. a portable electronic device with a removable battery may have the battery removed, in which case there may be no power or only a very limited backup power supply e.g. for the real time clock.

A user applied electrical overstress may be applied at any time, when the electronic device is in any of these states. The electrical overstress may be applied by a user making connections between the connector 101 and a source of electrical power that do not use a conventional mating connector, i.e. do not use a jack plug, and thus which would not cause the jack detect circuitry to register a device connection and transition to a mode where the codec 103 is fully powered. The electrical overstress may thus be applied when the codec is not fully powered. In some embodiments the register 206 of the electrical overstress monitor 106 may therefore be part of an always-on domain, i.e. a power domain of the electronic device 100 that is always powered, provided a suitable power source is available. The codec may therefore have a pin 208 for receiving power from an always on-domain of the electronic device and the electrical overstress monitor may be coupled to receive power from pin 208.

The electrical overstress monitor 106 may also comprise a communication module 207 for communicating with other parts of the electronic device, for instance for generating an interrupt for the applications processor 104. In the event of detection of an electrical overstress the communication module 207 may generate an interrupt for the application processor. This may cause the applications processor 104 to wake, i.e. power up, if necessary, and store data regarding the electrical overstress event in a register, e.g. a device log, possibly with information about the time of occurrence and/or other information of the type discussed above. The communication module 207 may likewise be implemented as part of an always on-power domain. The applications processor 104 may obtain data regarding the electrical overstress event from the register 206 of the electrical overstress monitor to be stored in the device log.

The information regarding the occurrence of an electrical overstress event, wherever recorded, may be read from the device and/or the device may be operable in a mode to show on a display of the device information regarding the electrical overstress device. The information may, in some embodiments, only be read and/or displayed in a certain mode of operation, such as a debug or protected mode of operation which may require input of one or more codes known only to a device manufacturer/supplier. This may prevent a normal consumer user of the device from accessing the information. In other embodiments however the information may be accessible to any user but may be protected so as not to be overwritten.

Figure 3:
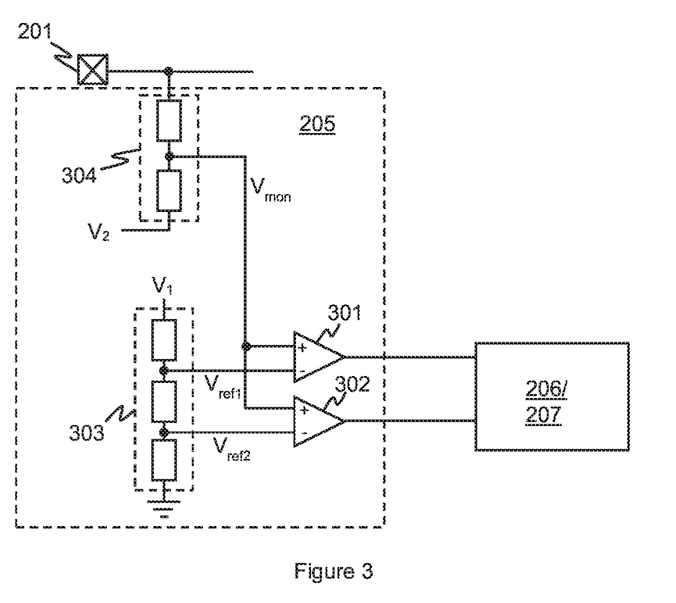
FIG. 3 illustrates one example of an overvoltage detector for monitoring for an overvoltage at a circuit pin.

The occurrence of a voltage above a predetermined magnitude or threshold level may be determined in a variety of different ways. FIG. 3 illustrates one example of an overvoltage detector 205 implemented for an individual pin, e.g. one of pins 201. The overvoltage detector of this embodiment comprises a pair of comparators 301, 302 for comparing a voltage $V_{mon}$ derived from the voltage at pin 201 with reference voltages $V_{Ref1}$ and $V_{Ref2}$ derived from an on-chip supply $V_1$, which may for instance be a supply voltage VDD available to the always-on part of the codec. The reference voltages $V_{Ref1}$ and $V_{Ref2}$ may be derived by a suitable resistive voltage divider 303 or in any other convenient way.

The voltage at the pin 201 may be stepped down by a voltage divider 304 to provide the monitored voltage $V_{mon}$. Voltage divider 304 has one end connected to the pin 201 and the other end connected to a voltage $V_2$ which is of the same polarity but lower magnitude than $V_1$, and may conveniently be equal to half the magnitude of $V_1$, e.g. this voltage may be VDD/2. The monitored voltage $V_{mon}$ will thus be equal to $V_2$ plus or minus a component related to the voltage at the pin 201 depending on polarity.

By appropriate choice of the step down ratio for the voltage at pin 201 then, unless the voltage at pin 201 is of high magnitude, the monitored voltage $V_{mon}$ will be around $V_2$, which as discussed above may be equal to half the magnitude of $V_1$. In such a case, with appropriate threshold levels, the monitored voltage would be below $V_{ref1}$ but above $V_{ref2}$. Thus, in normal operation the output of comparator 301 would be low, i.e. logic 0, and the output of comparator 301 would be high, i.e. logic 1. In the event of a high positive voltage the monitored voltage $V_{mon}$ will rise and may increase above $V_{ref1}$. In this case the output of comparator 301 would transition to high, i.e. logic 1. Were instead a high negative voltage applied to pin 201 the monitored voltage may drop to below $V_{Ref2}$ and thus the output of comparator 302 would transition to low, i.e. logic 0. Thus either comparator transitioning its output state would be indicative of a high voltage having been applied to the relevant pin, with the polarity of the voltage indicated by the relevant comparator. The output of the comparators 301, 302 may be provided to register 206 which may include logic for writing to the register and/or to communication module 207.

If desired additional information about the level of the voltage applied could be determined by providing additional comparators each comparing to a different reference voltage level.

Figure 4:
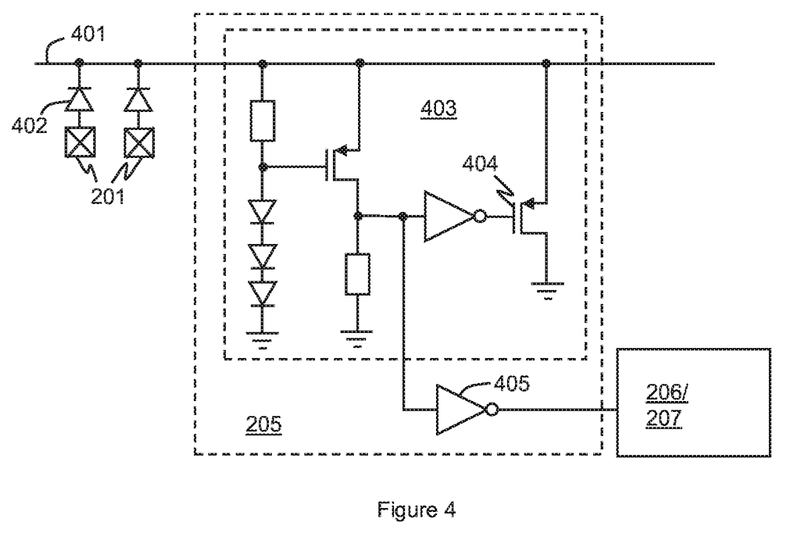
FIG. 4 illustrates one example of an overvoltage detector for monitoring for an overvoltage at a plurality of circuit pins.

FIG. 4 illustrates an alternative embodiment of an overvoltage detector 205 for monitoring for an overvoltage at a rail 401 to which multiple pins may be connected. For example it is common for the pins 201 to be connected to a supply rail by one or more diodes 402 for ESD protection or the like. For instance the supply rail may be the positive voltage supply rail VDD and diodes may be arranged to become forward biased in the event of a voltage spike at the pin. To provide at least some overvoltage protection for the rail 401 there may be a voltage clamping circuit 403 with a clamping switch 404 which is activated if the voltage level reaches a predetermined threshold to connect the supply rail to ground. The operation of such a clamping circuit 403 will be well understood by one skilled in the art and will not be described further.

The activation of the clamping circuit 403 may be used as a detection of an electrical overstress for the supply rail 401. In the example illustrated in FIG. 4 the output of inverter 405 will go high when the clamping circuit 403 activates the clamping switch 404 and this can be provided as a detection of an overvoltage to the register 206 and/or to communication module 207.

As noted above the electrical overstress monitor 106 may be implemented as part of an always-on power domain and thus may record an electrical overstress event even if the electronic device is off, provided that a source of power is available. It is possible however that a device battery may have run completely flat or, for devices with removable batteries, that the battery may have been removed. Thus there may in such circumstances be no power available for the always-on domain of the electronic device 100.

In some embodiments therefore the electrical overstress monitor 106 may be arranged so that an electrical overstress applied to a relevant connector 101, 102 results in a change of state of at least one component of the electrical overstress monitor 106 even when unpowered. The energy of the applied voltage may be used to cause a change in state of some non-volatile element. The change of state of the non-volatile element may itself be used as the recording that an electrical overstress event has occurred but this may require physical inspection of the relevant component. In some embodiments therefore the electrical overstress monitor may be configured such that a change of state of the relevant component can be detected once power is available to the electrical overstress monitor and, at that point recorded in the register.

Figure 5:
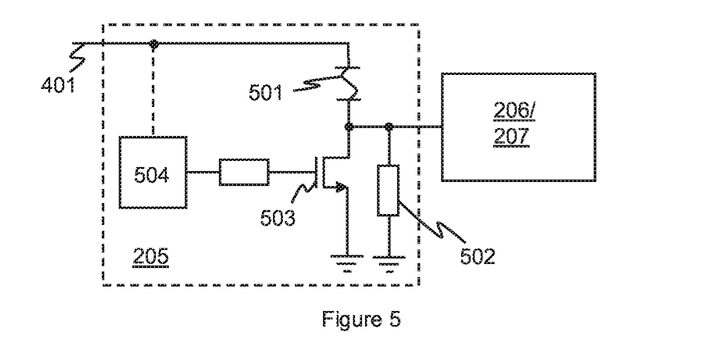
FIG. 5 illustrates another example of an overvoltage detector.

FIG. 5 shows one example of a suitable overvoltage detector 205. A supply rail 401 is connected to a voltage divider formed by a volatile component such as a fuse 501 and resistor 502. The midpoint of the divider is connected to the register 206 and/or communication module 207. In normal operation when power is available a voltage will appear at the input to the register circuit 206. The mid-point of the divider is also connected to a bypass switch 503 connected to an overvoltage detect circuit 504. The overvoltage detect circuit 504 may have the form described above with respect to FIG. 3 or the form described above with respect to FIG. 4. In use, when power is available, if the overvoltage detect circuit 504 detects an overvoltage the bypass switch is operated and the voltage at the input to the register 206 and/or communication module 207 drops to ground, signalling an overvoltage event has occurred. If no power is available a sufficient overvoltage may cause fuse 501 to burn out, thus disconnecting the supply rail from the midpoint of the divider. When the overvoltage detect module is powered back up the voltage at the input to register 206 and/or communication module 207 will remain zero, indicating that the fuse 501 has burnt out or blown and that there has been an overvoltage event, which can be logged by the register. Note that although discussed in reference to a fuse the circuit could be implemented with any volatile that changes state or varies characteristic in event of an electrical overstress so as to vary an electrical parameter at a measurement node. In some embodiments there may be a range of different volatile elements with different ratings so as to change state at different voltage levels, the various elements being arranged so that, when power is available, it can be determined which elements have changed state, e.g. which of series of fuses has blown, so as to provide an indication of the magnitude of the overvoltage.

In this instance information about the time and date of the recording of the overvoltage event may be recorded, along with the fact that it was recorded on power-up of the electrical overstress monitor.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. An integrated circuit comprising:
   a first set of one or more circuit contacts for connecting the integrated circuit to a connector of a host electronic device;
   one or more switching elements for selectively coupling the one or more circuit contacts to a positive power supply rail, wherein the one or more switching elements are configured to activate to couple the one or more circuit contacts to the positive power supply rail in the event of a voltage above a predetermined magnitude being applied to at least one of said one or more circuit contacts; and
   an electrical overstress monitor comprising an overvoltage detector, wherein the overvoltage detector is configured to monitor a voltage at the positive power supply rail to detect a voltage above the predetermined magnitude applied to the at least one of said one or more circuit contacts.

2. The integrated circuit as claimed in claim 1 wherein each of a plurality of circuit contacts of the first set is connected to a respective overvoltage detector.

3. The integrated circuit as claimed in claim 1 further comprising a voltage clamping circuit for clamping the voltage at the supply rail in the event of the voltage above said predetermined magnitude, wherein the overvoltage detector is configured to detect activation of the clamping circuit.

4. The integrated circuit as claimed in claim 1 wherein the electrical overstress monitor comprises a memory for recording the occurrence of an electrical overstress event.

5. The integrated circuit as claimed in claim 4 wherein the electrical overstress monitor is further configured to record information regarding the time of occurrence of the electrical overstress event in the memory.

6. The integrated circuit as claimed in claim 1 wherein the electrical overstress monitor comprises a communication module for communicating with other components of the host device in the event that an electrical overstress event is detected, wherein the communication module is configured to generate an interrupt signal for a processor of the host device.

7. The integrated circuit as claimed in claim 1 wherein the integrated circuit has a first circuit contact for receiving power from an always-on power domain of the host device and the electrical overstress monitor is coupled to receive power from said first circuit contact.

8. The integrated circuit as claimed in claim 1 wherein the electrical overstress monitor is configured to monitor an electrical parameter at a monitoring node when the electrical overstress monitor is powered and wherein the electrical overstress monitor comprises a variable state component that changes states in the event of a voltage above the predetermined threshold and wherein the electrical parameter at the monitoring node when the electrical overstress monitor is powered depends on the state of the variable state component.

9. The integrated circuit as claimed in claim 1 wherein at least one of the first set of circuit contacts is a circuit contact for transfer of analogue audio signals to and/or from the integrated circuit.

10. The integrated circuit as claimed in claim 1 wherein the integrated circuit is a codec circuit or a USB interface control circuit.

11. An electronic device comprising a first integrated circuit and a first device connector, wherein the first integrated circuit is an integrated circuit as claimed in claim 1 and wherein the first set of circuit contacts of the first integrated circuit is connected to the first device connector.

12. The electronic device as claimed in claim 11 wherein the first device connector is a jack socket or a USB receptacle.

13. The electronic device as claimed in claim 12 further comprising a device processor wherein the electrical overstress monitor of the first integrated circuit is configured to send a first control signal to the device processor following detection of an electrical overstress event.

14. The electronic device as claimed in claim 13 wherein, on receipt of the first control signal the device processor is configured to record the occurrence of the electrical overstress event.

15. The electronic device as claimed in claim 14 wherein the device processor is further configured to record information regarding the time of receipt of the first control signal and/or data relating to the operation of the electronic device before and/or after receipt of the first control signal.

16. The electronic device as claimed in claim 11 wherein the electronic device is at least one of: a portable device; a communications device; a computing device; a mobile telephone; a notebook, laptop or tablet computing device.

17. An electronic device comprising:
a first connector having at least one contact for connecting the electronic device to external apparatus;
one or more switching elements for selectively coupling the at least one contact to a positive power supply rail of the electronic device, wherein the one or more switching elements are configured to activate to couple the one or more circuit contacts to the positive power supply rail in the event of a voltage above a predetermined magnitude being applied to at least one of said one or more circuit contacts;
an electrical overstress monitor comprising an overvoltage detector, wherein the overvoltage detector is configured to monitor a voltage at the positive power supply rail to detect a voltage above the predetermined magnitude applied to the at least one of said one or more circuit contacts; and
wherein the electronic device is configured to record the occurrence of a voltage above the predetermined magnitude.

18. The electronic device as claimed in claim 17 wherein the electrical overstress monitor comprises a memory for recording the occurrence of the voltage above the predetermined magnitude.

19. The electronic device as claimed in claim 17 wherein a processor of the device is configured to output and/or display information regarding any occurrence of a voltage above the predetermined magnitude in response to a relevant command.

20. A mobile phone comprising:
a socket comprising an audio contact;
one or more switching elements for selectively coupling the audio contact to a positive power supply rail of the mobile phone, wherein the one or more switching elements are configured to activate to couple the audio contact to the positive power supply rail in the event of a voltage above a predetermined magnitude being applied to the audio contact; and
an overvoltage monitor, the overvoltage monitor comprising an overvoltage detector, wherein the overvoltage detector is configured to monitor a voltage at the positive power supply rail for detecting and recording a voltage above the predetermined magnitude applied to the audio contact.

* * * * *